United States Patent [19]

Roberts et al.

[11] 3,742,129

[45] June 26, 1973

[54] APPARATUS AND METHOD FOR GENERATING HALFTONES FOR IMAGE REPRODUCTION

[75] Inventors: Webster C. Roberts, Mayfield Heights; Alan M. Foster, South Euclid, both of Ohio

[73] Assignee: Harris-Intertype Corporation, Cleveland, Ohio

[22] Filed: July 7, 1971

[21] Appl. No.: 160,406

[52] U.S. Cl....... 178/5.4 CD, 178/5.2 A, 178/6.6 B, 178/6.7 R

[51] Int. Cl........................... H04n 1/46, H04n 5/84

[58] Field of Search...................... 178/5.2 A, 5.2 R, 178/5.4 R, 6.7 R, 6.6 B, 7.6, 7.7

[56] References Cited

UNITED STATES PATENTS

| | | | |
|---|---|---|---|
| 3,197,558 | 7/1965 | Ernst | 178/5.2 R |
| 3,381,612 | 5/1968 | Lecha | 178/5.2 A |
| 3,465,199 | 9/1969 | Simshauser | 178/6.7 R |
| 3,657,472 | 1/1970 | Taudt et al. | 178/6.7 R |

*Primary Examiner*—Howard W. Britton
*Attorney*—Yount and Tarolli

[57] ABSTRACT

Apparatus and method are provided for forming halftone reproductions of continuous tone color images wherein for each color component of an image a halftone pattern is formed with a plurality of dot characters. The dot characters vary in size with the tone level of the image to be reproduced and are spaced from each other in dependence upon the color component being reproduced in halftone copy.

25 Claims, 10 Drawing Figures

CONVENTIONAL HALFTONE SCREEN

CONVENTIONAL SCREEN ANGLES FOR COLOR REPRODUCTION

CRT SCREEN

INVENTORS
WEBSTER C. ROBERTS
ALAN M. FOSTER
BY Yount and Tarolli
ATTORNEYS

INVENTORS
WEBSTER C. ROBERTS
ALAN M. FOSTER
BY Yount and Tarolli
ATTORNEYS

INVENTORS
WEBSTER C. ROBERTS
ALAN M. FOSTER
BY Yount and Tarolli
ATTORNEYS

INVENTORS
WEBSTER C. ROBERTS
ALAN M. FOSTER
BY Yount and Tarolli
ATTORNEYS

APPARATUS AND METHOD FOR GENERATING HALFTONES FOR IMAGE REPRODUCTION

This invention relates to the art of printing and, more particularly, to the reproduction of continuous tone color images in halftone copy.

Color images are typically reproduced in halftone copy with the use of a halftone screen for each color to be printed. These screens take the form of a pattern of dots which are spaced along a line called screen line, with the dots being of varying sizes in accordance with the gray tone levels of the image to be reproduced. The screen lines for different color screens are oriented at different angles to reduce screen pattern or moire effect caused by the screen line pattern of the halftone dots when a plurality of halftone color images are printed over each other. The screen pattern, or moire effect, has been considered to be at an acceptable level for the graphic arts industry when the screen lines for the three darkest colors, black, cyan and magenta, are spaced 30° apart. The screen line for the yellow screen may be located between any two screen lines of the other colors and spaced therefrom by 15°. Thus, for example, the screen lines for black may be oriented at 45°, those for cyan at 15°, those for magenta at −15°, and those for yellow at 30°, between black and cyan. These are conventional screen angles in the graphic arts industry.

Typically such dots are formed by exposing photosensitive film to a tone image through a halftone screen transparency (such as a Kodak magenta screen). The desired resultant screen angles are achieved by rotating the screening transparency to the appropriate angle for each color. In the case of color scanners in which the color copy or uncorrected separation transparencies made from it are subsequentially scanned to provide electronic color correction it is still necessary to provide a separate screening step or to properly orient and interpose a screening transparency during the color correct transparency exposure. Consequently, a need exists for a more efficient system which will electronically generate the halftone dot patterns to minimize the time and expense involved in color reproduction.

Electronic phototypesetting mechanisms are known which, for example, may employ a cathode ray tube and accompanying circuitry for deflecting the cathode ray beam along the tube's face for purposes of generating alphanumeric characters or graphical images. These characters or images appear as illuminated portions on the face of the cathode ray tube and are recorded on a light sensitive record film which is processed for purposes of making printing plates to reproduce the generated character. A more efficient manner of forming halftone patterns for color reproduction would include the use of such electronic phototypesetter mechanisms. It is difficult, or not possible within practical limitations, to provide a cathode ray tube with the necessary circuitry to position a beam along arbitrary angles such as 45°, 30°, 15° or −15°. The tube faces of these mechanisms, however, are typically quantized in fixed beam deflection increments along both the perpendicular and horizontal axes. The increments are normally digital. Only a multiple of such increments of beam deflection in the horizontal and vertical directions can be combined to form a given angle. Consequently, then, the generation of halftone patterns with a screen line oriented along arbitrary angles, such as 15°, 30° and 45°, cannot normally be obtained with typical cathode ray tubes but must be approximated with an appropriate choice of integers. Such approximations, however, may result in unacceptable screen patterns or moire effects. If electronic phototypesetter mechanisms or similar apparatus are employed for forming the dot characters for halftone screens, optimum angles must be calculated in terms of the apparatus to be employed so as to avoid objectionable screen patterns when the halftone images are used in reproducing a continuous tone color image in halftone copy.

The primary object of the present invention is to provide apparatus and method for electrically generating halftone dot characters for use in reproducing color images in halftone copy.

Another object of the present invention is to generate a pattern of halftone dot characters by incrementally positioning a beam along a direction parallel to an axis in such a manner that halftone dot characters are recorded having screen lines oriented at a predetermined angle relative to the axis.

A still further object of the present invention is to provide apparatus and method whereby image generating means, such as electronic phototypesetters, which are quantized in fixed beam deflection increments may be employed in forming halftone patterns exhibiting screen angles and line spacings which will permit reproduction of color images in halftone copy with acceptable levels of screen pattern.

A still further object of the present invention is to provide apparatus and method for generating halftone dot characters wherein the characters are spaced apart in dependence upon the color component of an image to be reproduced in halftone copy and wherein the size of the dot characters is varied in dependence upon the gray tone level of the color image.

A still further object of the present invention is to provide apparatus and method whereby the dot characters are formed in parallel rows and wherein the spacing between the characters as well as the spacing between rows is varied in dependence upon the color component of the image to be reproduced in halftone copy.

In accordance with one aspect of the present invention, apparatus and method are provided for reproducing an image in halftone copy wherein an energy beam is deflected so as to form parallel rows of halftone dot characters parallel to an axis and spaced from each other to define a pattern of dot characters exhibiting screen lines oriented at a predetermined angle relative to the axis.

In accordance with one aspect of the present invention, apparatus and method are provided for reproducing continuous tone color images in halftone copy for each of a plurality of color components of the image, and wherein a plurality of tone level signals are provided each having a characteristic that varies with the tone level of a color image. Halftone dot characters are recorded on a record member in parallel rows in accordance with the tone level signals with the rows being spaced by a first distance and the dot characters in each row being spaced by a second distance, with the first and second distances being dependent upon the color component to be reproduced in halftone copy.

In accordance with a still further aspect of the present invention, apparatus and method are provided for generating halftone images for different color components of an image to be reproduced by deflecting an energy beam as it moves along a scan line across an energy responsive surface. In this aspect of the invention, the halftone dot characters are generated at a predetermined position along a scan line, with the size of the characters being dependent upon the tone level of the image to be reproduced and with the spacing between the dot characters being dependent upon a color component of the halftone image.

In accordance with a more limited aspect of the present invention, a storage means is employed for the purpose of storing a plurality of sets of coded instructions each to be used for purposes of deflecting an energy beam to form the respective dot characters. Circuitry is also provided in this aspect of the invention for purposes of selecting sets of coded instructions and effecting deflection of the beam in response to tone level signals to form dot characters at the correct positions along the scan line.

In accordance with a still further aspect of the present invention, the storage means serves to store instructions for forming different dot characters of sizes representative of different tone levels of the image to be reproduced and also serves to store spacing information for the appropriate spacing between adjacent dot characters in dependence upon the color component to be reproduced in halftone copy.

The foregoing and other objects and advantages of the invention will become more readily apparent from the following description of the preferred embodiment of the invention as embodied in the accompanying drawings which are a part hereof and wherein.

Figure 1:
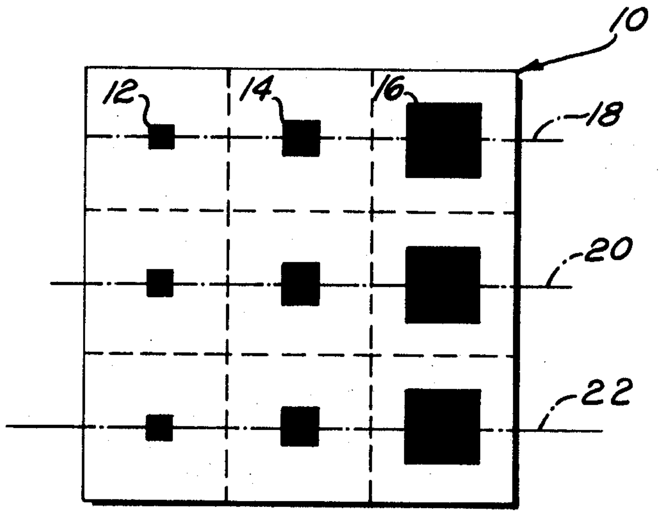
FIG. 1 is an illustration of a conventional halftone screen employed in color reproduction.

Referring now to the drawings, FIG. 1 is a graphical illustration of a halftone screen 10 formed by conventional techniques, such as photoetching. The screen includes a pattern of halftone dot characters of varying sizes. Thus, dot characters 12, 14 and 16 are spaced along a screen line 18 by equal increments and are of uniformly increasing size representative of three different tone levels. Such a screen may be used for a black and white reproduction with varying levels of gray tone. Additional dot characters corresponding to dot characters 12, 14 and 16 are arranged along screen lines 20 and 22, which are parallel to screen line 18. In reproducing a continuous tone image with a single halftone screen for black and white reproduction there may be more or less tone levels 12, 14 and 16 at various locations. The dot characters may be of varying shapes, such as circular dots, rectangles or various other shapes peculiar to the particular screening process employed. Typically, however, these dot characters are aligned along parallel screen lines, such as screen lines 18, 20 and 22, with the screen lines being equally spaced from each other.

Figure 2:
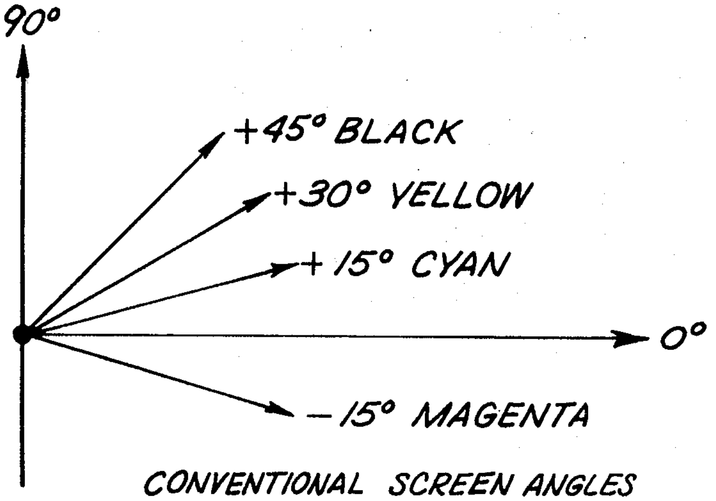
FIG. 2 is an illustration of conventional screen angles employed in color reproduction.

In color reproduction, it is conventional to utilize a halftone screen for each of the subtractive primaries black, magenta, cyan and yellow. Each screen is similar to screen 10; however, the screen lines are oriented at different angles so as to minimize screen pattern which is the unwanted geometric design or moire effect caused by the confusion of the screen line pattern of the halftone dots. Thus, any time two or more groups of dots are over printed a pattern is created wherein each dot or line of one group does not maintain a constant and uniform relationship to the dots or the lines of the other groups. This creates a design of parallel lines or cross-patch dependent upon the nature of the printing involved, and exhibits an appearance similar to that of a Scotch plaid. Over the years, the graphic industry has found that this objectionable screen pattern may be minimized by orienting halftone screens so that the screen line patterns of the dots are angularly oriented with respect to each other, with the three darkest colors black, cyan and magenta being 30° apart. Yellow, the lightest color used in four color printing, obtains the least objectionable moire pattern and its screen lines are typically oriented between two of the darker colors. Thus, for example, as shown in FIG. 2, a conventional pattern of screen angles for four color reproduction may have the screen lines for black being oriented at 45°, cyan at 15°, magenta at −15° and yellow being located midway between cyan and black at 30°.

Whereas screen patterns may be rotated accurately to obtain screen angles of this nature, substantial difficulties are obtained in attempting to accomplish the screen angles by electronic formation of dot characters, as with an electronic phototypesetting apparatus. Thus, an electronic phototypesetting apparatus conventionally employs a cathode ray tube wherein the cathode ray beam is displaced to form light images on the display face. The beam is typically displaced in either horizontal or vertical increments. It is impractical to provide deflection controls or to physically rotate the cathode ray tube which would cause the beam to be displaced along lines corresponding to arbitrary angles, such as 45°, 30°, 15° and −15°, to position dot characters along screen lines oriented at such angles. It is desirable, therefore, that means be provided whereby the cathode ray beam may be displaced along the horizontal axis while generating dot characters having screen lines oriented at predetermined angles.

Figure 3:
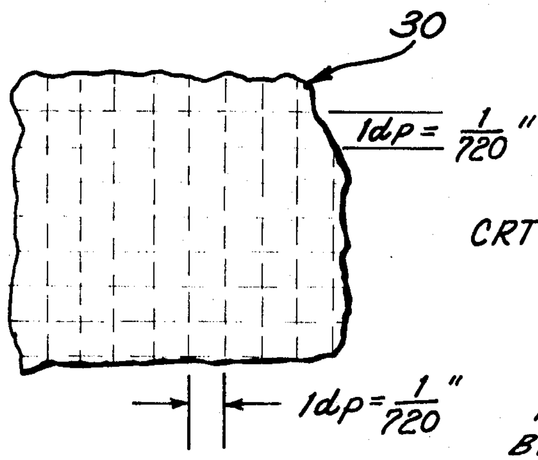
FIG. 3 is a graphical illustration showing the manner in which the face of a cathode ray tube of an electronic phototypesetting apparatus is quantized in fixed increments.
Figure 4:
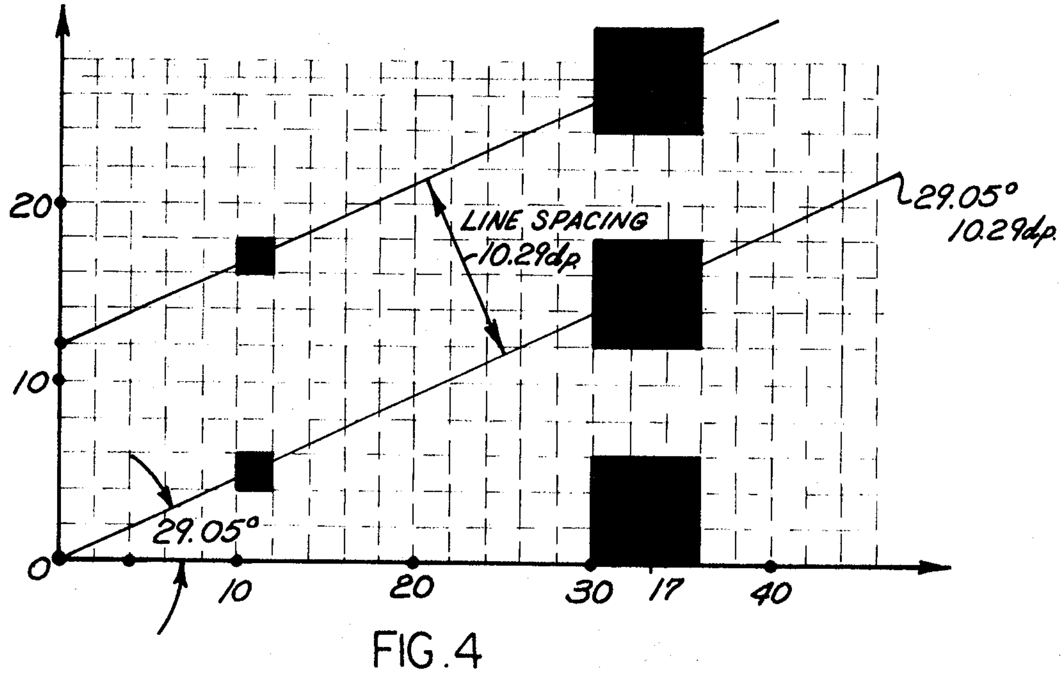
FIG. 4 is a graphical illustration showing the manner in which halftone dots may be electronically generated with electronic phototypesetting apparatus.

Typically, the cathode ray tube of a phototypesetting apparatus is quantized in digital increments. Display portion 30, representative of a portion of the screen of a cathode ray tube, is illustrated in FIG. 3 with the face of the display portion being quantized in decipoints (d.p.). A decipoint is a measure of length employed in a graphic arts industry with one decipoint being equal to one seven hundred twentieth of an inch. Consequently, the beam of the cathode ray tube is displaced in multiples of decipoint increments along either the horizontal or vertical axis for purposes of producing an image on the face of the display screen. It is not possible, therefore, to form dot images on the display face along arbitrary screen angles, such as 15°, 30° and 45°, which are not obtainable in terms of multiples of decipoint increments along the horizontal and vertical axes, where the display face is quantized in such increments. Such screen angles can be approximated on the face of a cathode ray tube, quantized in decipoint increments. For example, a 30° halftone screen with a 10 decipoint line spacing between screen lines can be approximated by an integer combination which yields a screen angle of 29.05° with a grid spacing of 10.29 decipoints. Such an approximation is shown for purposes of illustration in FIG. 4. Additional screens with similar approximations for the screen angles may be made with similar accuracy. However, in experimentation it was found that an overlay of the screens for the three dark colors black, cyan and magenta, with the screens being approximated as shown in FIG. 4, a 98 decipoint moire pattern resulted. Such a pattern is not within acceptable limits for high quality graphic reproduction.

The screen pattern or moire effects may be better understood with reference to a simple illustration of two symmetrical screen patterns being printed over each other. An optical interference will appear, and this interference or "moire" is the regular appearance of areas which are densely settled with screen dot impressions alternating with areas which are less densely settled. This pattern has the same symmetry as both original screen patterns, i.e., the moire pattern of two line screens is a line, of two quadratic screens, a square. The size of the moire pattern, is defined as the shortest distance between two maxima, and is a function of the line spacings and the angles of rotation of the original screen patterns. The moire patterns are apparent from the screen lines alone as well as from the actual printed dots. Consequently, the lines which make up a screen pattern rather than the dots which make up a halftone may be analyzed to determine moire effects.

Figure 5:
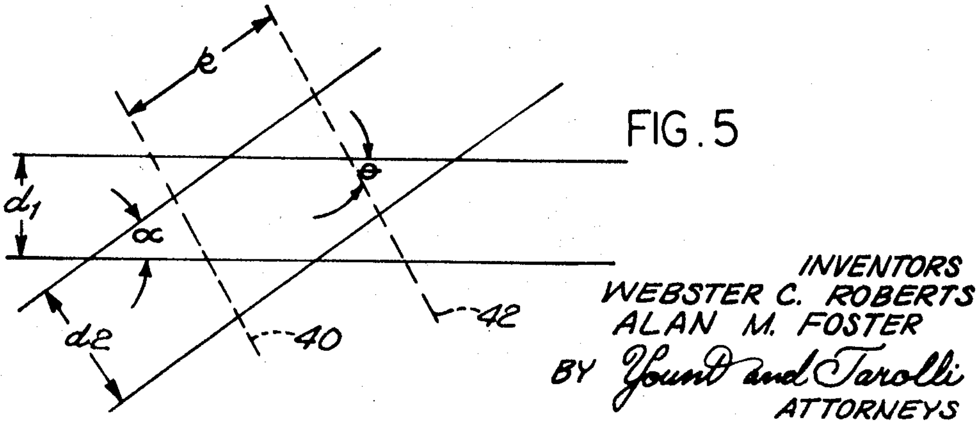
FIG. 5 is a graphical illustration schematically showing a moire pattern for two halftone patterns.

In FIG. 5 two parallel line screen patterns are placed over each other and at an angle $\theta$, with a moire pattern obtained in the form of bands 40 and 42 displaced from each other by a distance $K$. The two line screens are shown having periods (or line spacings) $d_1$ and $d_2$, respectively. The size of the moire pattern or distance $K$ may be calculated as:

$$K=\frac{d_1d_2}{\sqrt{d_1^2+d_2^2-2d_1d_2\cos\alpha}} \qquad \text{(Equation 1)}$$

where $\alpha$ is the angle between screens.

The orientation of the moire bands may be calculated as:

$$\theta=\tan^{-1}\left[\frac{d_1\sin\alpha}{d_2-d_1\cos\alpha}\right] \qquad \text{(Equation 2)}$$

where $\theta$ is the angle of the moire band as defined in FIG. 5.

From the above calculations it is seen that the moire pattern of two symmetrical screen patterns printed over each other varies as a function of both the screen angle as well as the line spacings. Taking two halftone screen patterns at a time, a parameter search may be made within the constraints of equations 1 and 2 above to determine optimal combinations of screen angles and line spacings which may be obtained with an electronic phototypesetting apparatus which is quantized in decipoint beam deflections. An experimentation mathematical model was developed which is capable of evaluating 624 possible moires occurring in a given three color screen pattern combination. A parameter search was made in which the black screen pattern was specified at a given angle, and with a given line spacing along with the upper and lower line spacings acceptable for the two screen patterns (magenta and cyan). A search based on a mathematical model was then conducted over all the possible combinations of screen angles and spacings in order to determine an acceptable combination which yields a moire pattern within given limits.

In a specific example in practicing the invention, a program was tested based on a black screen pattern oriented at 45° with 7.07 decipoints between lines (102 lines per inch). The other line spacings for magenta and cyan were allowed to vary between 6 decipoints and 8 decipoints (120 and 90 lines per inch) and combined with a finite number of "digital" angle locations available yielded 625 possible search points. The optimal solution for the other two dark colors resulted in magenta at 63.4° with a 6.7 decipoint grid (107 lines per inch) and cyan at 26.6° with a 6.7 decipoint grid. This combination displays a maximum moire pattern of 21.2 decipoints at 45° and in practice, such a moire pattern is nearly invisible and, hence, is acceptable for graphic art quality reproduction.

Figure 6:
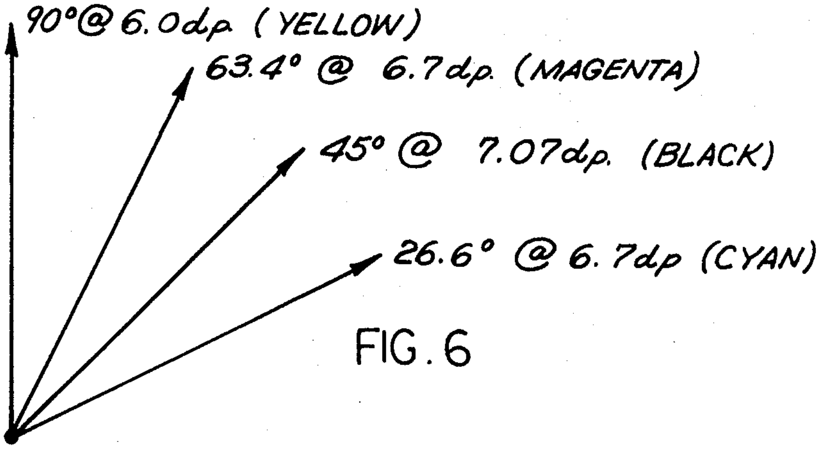
FIG. 6 is an illustration of computer calculated screen angles and line spacings for halftone patterns in accordance with the present invention.

Since yellow is much less intense, the moire caused by its screen does not have to be weighted as heavily. Consequently, the yellow screen pattern location is determined by another search for a minimum moire pattern between yellow and the optimal solution determined previously. For the example given above, the yellow screen lines should be placed at 90° with a line spacing of 6.0 decipoints (120 lines per inch). This results in a theoretically acceptable yellow moire of 30 decipoints at 90°. These calculations were made with a computer for ease in calculation. The acceptable screen angles and line spacings discussed above are illustrated graphically in FIG. 6.

Figure 7:
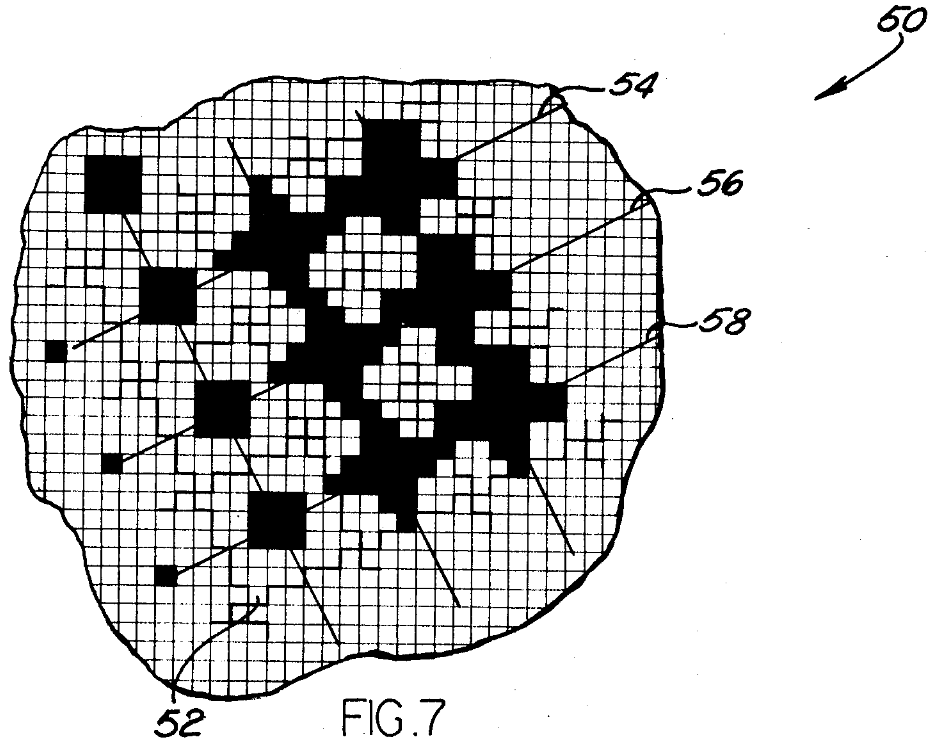
FIG. 7 is a graphical illustration showing a portion of a cyan halftone pattern constructed in accordance with the present invention.

Referring now to FIG. 7, there is illustrated a portion of a halftone 50 constructed in accordance with the present invention. This halftone is made from a recording medium, such as light sensitive film, which has recorded thereon images or dot characters formed on the face of a cathode ray tube to which the record member has been exposed. The record member is then processed in a conventional fashion for use in making suitable printing plates. The halftone 50 has dot characters formed thereon in accordance with the present invention. The dot characters vary in size in terms of decipoints. For purposes of illustration, halftone 50 in FIG. 7 is shown with background grid lines spaced apart in both the horizontal and vertical directions by one decipoint. Each dot character is formed uniformly outward from the center of a character field 52, which upon examination of FIG. 7, includes 45 squares each being 1 decipoint in dimension. Although various configurations may be formed it is preferred, in accordance with the present invention, that for increasing gray levels the dot shape should increase symmetrically outward from the center of each field and meet adjacent dots in adjacent fields with some degree of uniformity. Although only four different sized dot characters are shown in FIG. 7, it is to be appreciated that within the constraints of each field 52, 45 different gray levels or dot characters are possible. The screen lines 54, 56 and 58 of the dot pattern 50 are oriented to define a screen angle of 26.6° with a grid spacing of 6.7 decipoints (107 lines per inch). This is the screen line spacing and angle for cyan.

Figure 8:
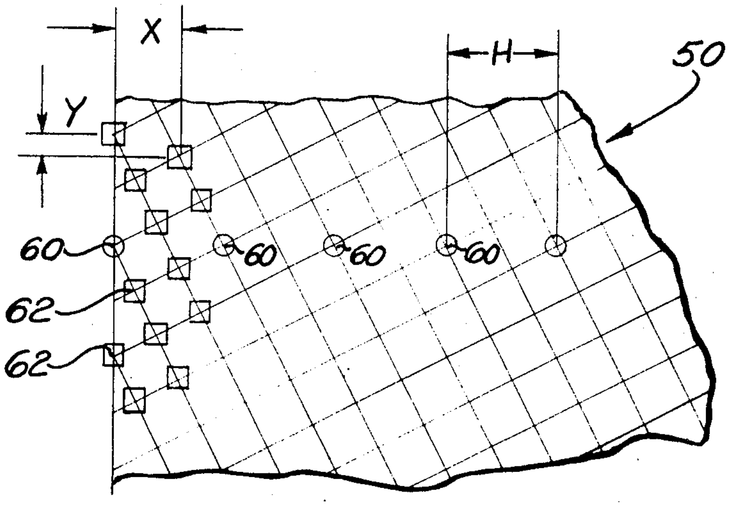
FIG. 8 is a graphical illustration showing the screen lines of the halftone pattern in FIG. 7.

Referring now to FIG. 8, there is illustrated the grid lines only of halftone 50 with the intersections of the grid lines representing the centers of halftone dot characters for a cyan screen. Certain of these intersections, as indicated by circles 60, periodically repeat themselves every 15 decipoints horizontally. This distance is indicated in FIG. 8 by distance H. The starting intersection or point for each of these horizontal rows is indicated in FIG. 8 by the squares 62. From an observation of FIG. 8 it will be noted that the horizontal rows are spaced vertically from each other by uniform distance Y, which in the case of cyan is calculated to be 3 decipoints. Furthermore, it will be observed that the starting point of each row is offset horizontally from the starting points of the preceding row by a variable distance X. Whereas the distance H remains constant for all of the rows and the distance Y remains constant for the vertical spacing between the rows, the spacing X varies from row to row. This distance X, however, may be calculated for each row in the following manner:

1. After the first row of dot characters has been generated, displace the beam downward 3 decipoints and return to a refernce left margin.

2. Move horizontally to an initial location given by subtracting 6 from the horizontal location of the first dot character from the previous row. If the resulting number is negative, add 15, i.e.,:

a. $X_n = X_{n-1} - 6$ b. if $X_n < 0$, then c. $X_n \leftarrow X_n + 15$

By proceeding in the manner described above, the halftone screen is composed by small displacements, i.e., displacement H between dot characters and only one horizontal spacing command for the offset distance X and only one vertical spacing command for the vertical distance Y. Other screen angles may be formed in the same manner for the black, magenta, and yellow by substituting the appropriate integer parameters. For each halftone a unique combination will exist for distances H, X and Y in dependence upon the computed screen angles and line spacings.

In the preferred mode of practicing the invention, it is contemplated that a continuous tone color image, such as a color photograph, will be scanned with a suitable scanning mechanism to provide a pattern of tone level signals representative of tone levels at corresponding scan points in each of a plurality of like scan lines. Depending on the apparatus employed, a color picture may be scanned only once to obtain the tone level signals for each of the subtractive primaries cyan, magenta, black and yellow, or it may be necessary to scan the colored image for obtaining raw data for each color component. In either case, it is contemplated that raw data of tone levels at various scan points along each of a plurality of scan lines be complied and processed for purposes of making a control tape or the like, and which may be used for electrically generating dot characters, as with the use of an electronic phototypesetting apparatus. The header data for each color component should include an indication of the color involved, the address of each starting position for each scan line, the gray tone levels at various incremental scan points along each scan line, the incremental spacing between scan lines, and a designation that a scanning operation has been completed. From this raw data the gray tone levels may be manually plotted on a graph. Selection can then be made of the addresses and corresponding tone levels of selected scan points in each scan line in dependence upon the screen color. Thus, for example, for a cyan screen pattern the scan points in each scan line will be selected from those which are 15 decipoints apart and with the increments between scan lines being 3 decipoints. The offset distance X of the first scan point in each scan line will be determined from the formula presented hereinbefore. This process is repeated for each screen color. The process, of course, may be accomplished automatically as with the use of a general purpose computer. Thereafter, a control tape is made either by hand or with such a computer for operating a mechanism for electronically generating the correct dot characters for each of the screens. In the event a phototypesetting apparatus is employed, then the control tape should include coded information including: the screen color, the relative position of the first character in the first dot character line, a series of character selection command signals to be used for interrogating a dot character memory to obtain therefrom dot character forming instructions corresponding with a particular tone level, an end of line designation, the offset information for the first dot character of the next dot character line, and the vertical distance increment between dot character lines. This information may then be used to command a phototypesetting apparatus to generate halftone screen patterns for each of the primary colors.

Figure 9:
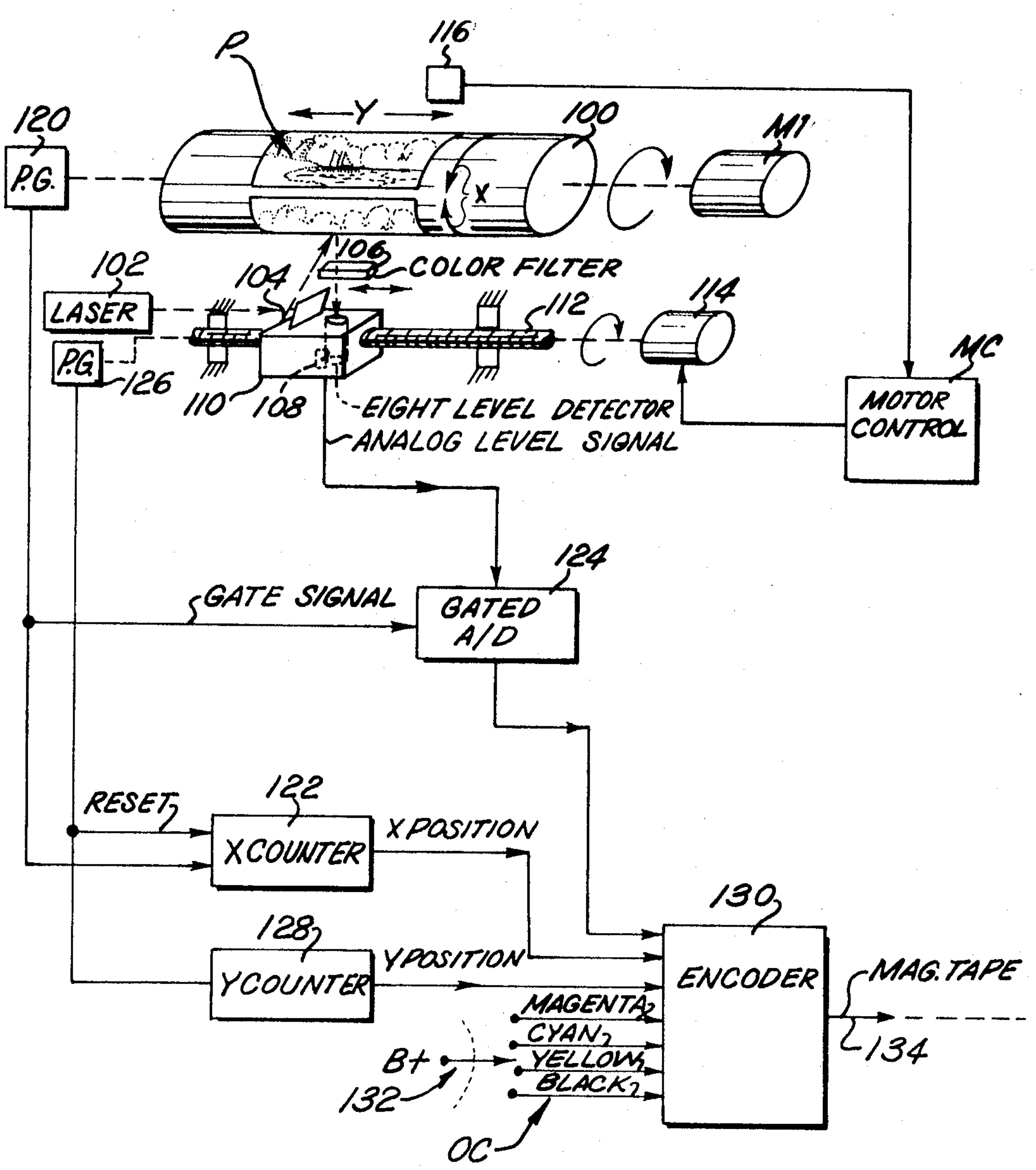
FIG. 9 is a combined schematic-block diagram illustration of a scanning apparatus which may be employed in practicing the present invention; and, FIG. 10 is a combined schematic-block diagram illustration of an electronic phototypesetter mechanism which may be used in practicing the present invention.

An optical scanner which may be employed in the present invention is chematically illustrated in FIG. 9 and includes a drum 100 to which a colored image, such as photograph P, is suitably secured and carried by the drum as it is driven about its axis of rotation by a motor M1. The photograph P may be secured in ay suitable fashion to drum 100 and, for example, the X axis coordinate may be considered as the distance the drum rotates in each cycle of rotation and the vertical or Y distance being the dimension of the photograph extending parallel to the axis of rotation. Photograph P is scanned in a rastor-like fashion as the drum rotates with the use of any suitable optical mechanism such as a laser beam generated by a laser generator 102 and reflected from a suitable mirror 104 to the surface of photograph P so that a scan line is defined for each cycle of rotation of drum 100. The light reflected from photograph P is directed through a color filter 106 with the filtered light beam being received by a light level detector 108. Filter 106 is conventional and serves to filter out all of the colors except the color being recorded. Thus, in the case of constructing a cyan screen, only cyan light is passed through the filter to the light level detector 108 as gray tone levels. Mirror 104 and light level detector 108 may be carried by a housing 110 which is driven along an axis parallel to the axis of rotation of drum 100 by means of a lead screw 112 driven by a stepping motor 114. During each scan along the X axis of photograph P, the housing 110 is held stationary and is then indexed each time drum 100 completes a cycle of rotation. This may be accomplished with the use of a sensor 116 which senses the gap between the ends of photograph P, once during each cycle of rotation, and applies a pulse signal to a motor control circuit MC which, in turn, serves to actuate the stepping motor 114 to obtain one increment of movement of housing 110.

The output signal taken from the level detector 108 takes the form of an analog level signal, in that the magnitude of the signal varies with the gray tone value along the scan line. This information should be made available in terms of its X, Y address on photograph P. The gray tone output may be an analog signal which may be converted into a corresponding digital signal. Either form is contemplated by the present invention, however, in the embodiment as illustrated and described herein, it is contemplated that digital signals be employed.

As drum 100 is rotated, a suitable pulse generator 120 is actuated to provide time spaced pulses and these pulses are applied to an X counter 122 which serves to provide a pattern of coded digital signals representative of the address of a scan point along the X direction on photograph P. For each X address position, a gate signal is applied to a gated analog to digital converter 124 which serves to convert the analog signal level into a pattern signal of coded digital signals representative of the gray tone level for the associated scan point. Since several scan lines will be made along the Y direction, each time the housing 110 is incremented along the Y direction, a second pulse generator 126 is actuated to apply a pulse to a Y counter 128 which serves to provide a pattern of coded digital signals representative of the scan line position in the Y direction. The X counter 122 is reset each time the Y counter 128 is indexed by one step. This apparatus, then, provides in coded digital signals the gray tone level and address of each scan point along the X direction of photograph P, as well as the scan line spacing in the Y direction.

From the information provided by counters 122 and 128 and the analog to digital converter 124, a graph may be made in the terms of X and Y coordinates showing the various scan points and their gray tone levels. This may be done for each color. It is contemplated, however, that this coded digital information be recorded on a magnetic tape with the use of a conventional encoder 130 which serves to receive the digital information from counters 122, 128 and the analog to digital converter 124. In addition, a suitable means, such as switch 132, may be employed for providing a signal to the encoder as to whether the information received is to be used for making a halftone for black, yellow, cyan, or magenta or any other color for which a halftone is to be constructed. It is contemplated that the magnetic tape have recorded thereon digital coded information which provides information as to the screen color, the address for the start of the first scan line, the tone levels at each scan point along the X direction, an end of line designation after each scan, the scan line increment for the next scan line in terms of the distance along Y direction of photograph P, and then continuing through the remaining scan lines and terminating in an end of scan designation. If colors are scanned separately it is contemplated that the scanning would be set to give the correct line spacing.

The invention may be practiced by the newspaper industry where newspapers may, for example, be printed in several editions and at different locations. Consequently, once the raw data scan line information is encoded by encoder 130 and recorded on a magnetic tape 134 the tape may be transported to a remote location where the information is read by a tape reader and typesetting instructions are made for operating an electronic typesetter apparatus. As previously described, such a control tape may be constructed from graphs plotted from the scan point information for each color or with use of a computer which is programmed to construct the typesetter command tape. If a computer is employed it is contemplated that it may be located at a station remote from either or both the scanner and typesetting equipment. Magnetic tape 134 may, therefore, be read by a remotely located tape reader 136 which communicates with a general purpose computer 138 as by wire for applying electrical signals to the computer in accordance with the digital information recorded on tape 134. The computer may then provide a print out in the form of a magnetic tape containing the typesetter commands in digital coded format with the tape then being transported to the location of the typesetter. Alternatively, the computer may communicate directly with the phototypesetter equipment as by wire. For purposes of illustration herein it is assumed that computer 138 provides a readout in the form of a magnetic tape 140 containing typesetter commands in the form of coded digital instructions. This tape is then read by a tape reader, which serves to control the operation of the electronic typesetter.

The extent of information stored and its format will vary in dependence upon the type of electronic typesetter employed for constructing the halftones. For example, in the description previously given with reference to the screen lines of FIG. 8, it was pointed out that for cyan the horizontal distance between dot character positions is fixed as a distance H, and in this particular case as 15 decipoints. This information may be stored on the control tape 140 so that for each dot character formed the typesetter is instructed to index the cathode ray beam horizontally by a distance equal to 15 decipoints. In such case, all colors may use a single library or font of character sizes. Alternatively, where each color has its own library or font of character sizes to be stored, then this information may be stored in a character memory within the phototypesetting equipment along with the information for forming each dot character. For purposes of illustration herein, the invention is described in conjunction with this information being stored in the character memory and, hence, the control tape need not include dot character spacing information. It is contemplated, however, that the command tape 140 stores information in a suitable digital coded fashion to provide the following instructions and in the following order: the color for the halftone to be generated, the starting location for the first scan line, a series of dot character commands respectively corresponding with associated gray tone levels, an end of line command after each scan line has been recorded, a leading command for indicating the increment of distance between horizontal dot character lines, an offset command for indicating the offset position along the horizontal axis for the first dot character in each scan line, and an end of scan command. It is contemplated that the extent of leading increment Y may be stored in the typesetter and the correct leading increment be provided in dependence upon the color component being reproduced in halftone copy.

Figure 10:
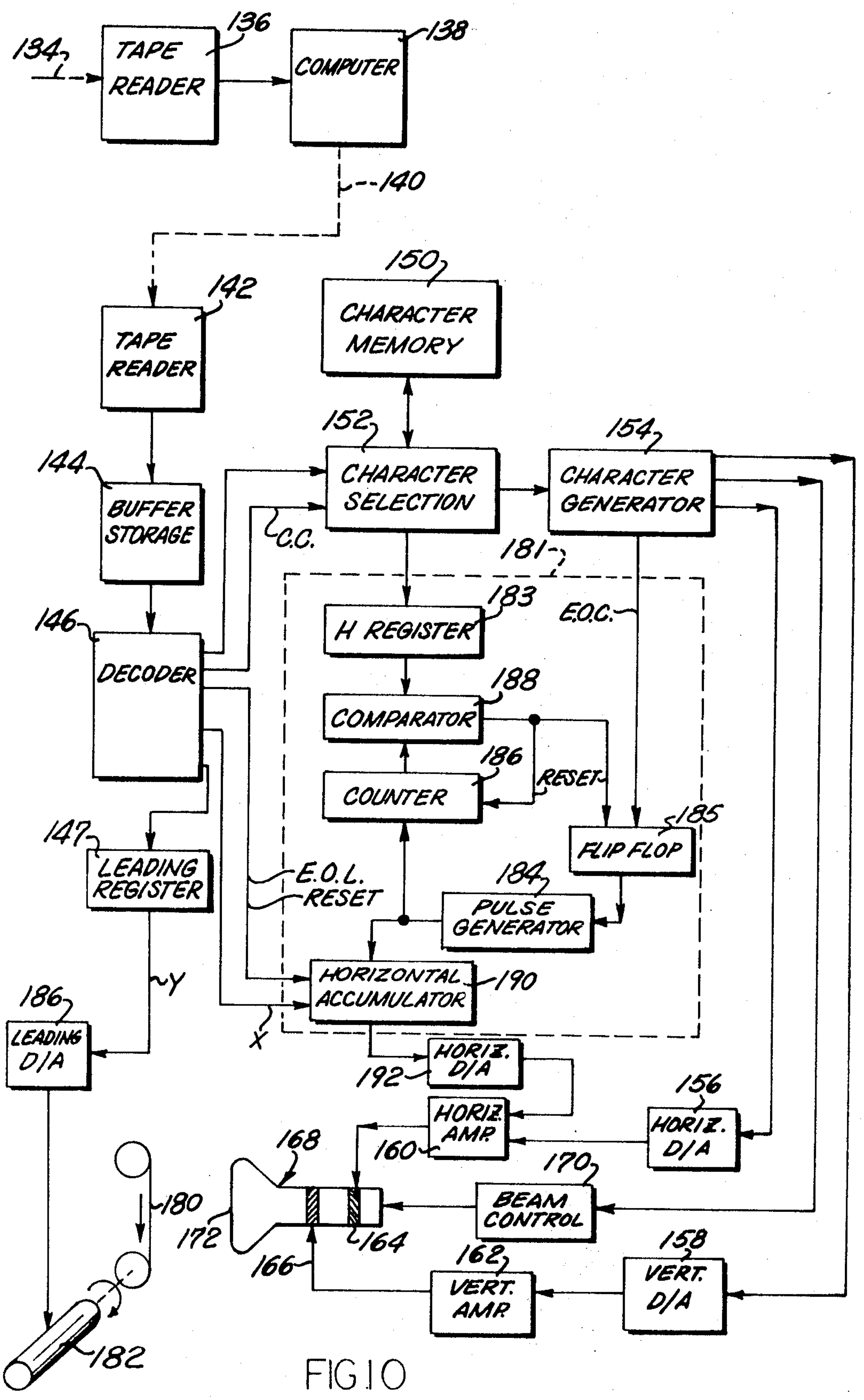

An electronic phototypesetter which may be employed in practicing the invention is illustrated in FIG. 10 and includes a tape reader 142 for reading the magnetic tape 140 and converting the recorded digital signals into corresponding electrical signals which are applied to a conventional buffer storage circuit 144. The buffer storage circuit 144 serves to receive the information at the transport rate of the tape reader and this information is then decoded by a decoder 146 at a rate in accordance with the operational speed of the phototypesetter. The decoder 146 then routes the information to its appropriate address such as to a character selection circuit, a horizontal accumulator or a leading register to effect various typesetter operations. In addition to decoder 146, the typesetter employs a character memory 150 which, as will be described in greater detail hereinafter, serves to store coded digital information for forming various dot characters, as selected by a character selection circuit 152 under command from the decoder circuit 146. The dot character forming instructions received from the character memory 150 are applied by the character selection circuit to a character generator circuit 154 which, for each dot character being formed, provides digital instructions for a horizontal digital to analog converter 156 and a vertical digital analog converter 158 to provide horizontal and vertical deflection signals. These deflection signals are respectively amplified by a horizontal amplifier 160 and a vertical amplifier 162 for application to the respective horizontal deflection coil 164 and the vertical deflection coil 166 of a cathode ray tube 168. The beam of the cathode ray tube 168 is deflected along lines parallel to its horizontal and vertical coordinate axes in accordance with the deflection signals obtained from the horizontal amplifier 160 and the vertical amplifier 162. As is conventional, the character generator 154 actuates a beam control circuit 170 each time the beam is to be unblanked, as when generating a character on the display face 172 of the cathode ray tube.

As images are produced on the display face 172 of the cathode ray tube the images are recorded on a light sensitive recording medium 180 which is driven incrementally in the vertical direction by means of a motor 182 controlled by a leading register 147 and a leading digital to analog converter 186. These increments in vertical spacing determine the vertical spacing between lines of dot characters and the spacing increments are varied in dependence upon the computer generated command Y which, as will be recalled, will vary in dependence upon the particular color halftone being generated. It is contemplated that the leading function may be otherwise obtained; to wit, by electronic leading wherein medium 180 is held stationary and the cathode ray beam is incrementally displaced.

Referring now to the halftone illustrated in FIG. 7, it will be noted that the dot characters vary in size dependent upon the gray tone level being reproduced in halftone copy. The dot characters may be produced by a series of individual spots on the display face 172 of the cathode ray tube, or by strokes of the cathode ray beam between two points. One method of generating dot characters is described in a co-pending U.S. application, Ser. No. 710,349, filed in the names of E. R. Kolb and R. N. Horvath on Mar. 4, 1968 and assigned to the assignee of the present invention. The method of character generation in that application includes sequentially directing the beam of a cathode ray tube to preset image positions to form a desired pattern of images or spots in accordance with instructions taken from a character memory. The present invention may be practiced with the method and apparatus found in the above-identified application; although, as stated above, other methods for forming the dot characters may be employed.

In practicing the invention, the character generator 154, the character selection circuit 152 and the character memory circuit 150 may all take the form as the corresponding circuits illustrated and described in the above named application. The character memory 150, for example, takes the form of an optical disc on which the instructions for forming the dot character are recorded in a digital code suitable for operating the character generator 154 in incremental steps. Each dot character is stored by a digital code in the character memory so that when a particular dot character is to be produced in response to a command signal CC from decoder 146, the correct coded information in the character memory 150 is selected or interrogated by the character selection circuit 152 and, then, this information is routed to the character generator circuit 154 for forming the desired dot character.

As a line of dot characters if formed on the face of cathode ray tube 172 it is contemplated that the dot characters will be positioned horizontally by a particular increment H which varies in spacing in accordance with the color of the halftone to be generated. In the case of cyan, the spacing H is 15 decipoints. Although this spacing information may be coded on the computer generated magnetic tape 140 it is contemplated that the information be stored in the character memory 150 so that when a halftone for a particular color is being generated a library or font of dot characters associated with that particular color is available to the character selection circuit together with the correct incremental spacing H. If a single font of characters is used for all colors, a color code may be used to render the typesetter responsive to a register which stores the correct spacing for that color so that the proper spacing is inserted between dot characters.

The positioning of the cathode ray beam from one dot position to the next along the horizontal axis to obtain dot character positions spaced by distance H may be achieved in various fashions. A control circuit 181 illustrated in FIG. 10 may perform this function, although it is to be appreciated that various circuits may be substituted. Control circuit 180 includes a horizontal register 183 which serves to receive a digital number from the character selection circuit 152 representative of the horizontal distance H to be used for the desired halftone screen color. In the example of cyan, the digital information stored in register 183 is indicative of the decimal number 15. Each time a character is generated it is contemplated that the character generator 154 apply an end of character signal to actuate or set a flip-flop circuit 185. Once this flip-flop circuit is set it, in turn, actuates a pulse generator 184 which applies pulses to a digital counter 186. A comparator 188 compares the continuously increasing digital number in counter 186 with the digital number in register 183 and when the two numbers are equal the comparator resets flip-flop 185 and resets counter 186. As the pulse generator 184 is providing pulses, in this case a series of 15 pulses, the horizontal accumulator 190 is being updated by a digital number equivalent to 15 steps. The horizontal accumulator 190 provides digital information as to the desired position of the cathode ray beam across the face of display surface 172. This information is converted into an analog signal by a hortizontal digital to analog converter 192 and applied through the horizontal amplifier 160 to the horizontal deflection coil 164. Consequently, control circuit 181 serves in the manner discussed above to incrementally position the cathode ray tube beam by a distance H in the horizontal direction after each dot character has been generated. The distance H will vary in dependence upon the color for which the halftone is to be generated.

After a line of dot characters has been recorded on record member 180 an end of line command, E.O.L., is provided by the decoder circuit 146 to reset the horizontal accumulator 190 to its zero count. Since the cathode ray tube beam follows the count in the horizontal accumulator, the beam will return to its original position, such as a left side reference margin. In addition, a leading command Y is provided by decoder 146 to actuate the leading digital to analog converter 186 to drive the stepping motor 182 by a predetermined number of increments so as to properly index the record member 180 in the vertical direction. This distance will be dependent upon the color for which a halftone screen is to be generated. Having positioned the beam vertically for the next line of dot characters, the decoder 146 now applies an offset command X to the horizontal accumulator 190 to properly position the first dot character in the new line of dot characters to be generated. This offset command may be computer generated and, as will be recalled from the description given with respect to FIG. 8, will vary from dot character line to dot character line in the generation of each halftone.

Each of the halftones for the four subtractive primaries black, cyan, magenta and yellow will be constructed with the phototypesetting apparatus in the manner described above pursuant to the instructions on the typesetter command tape 140.

Halftones have been constructed in accordance with the invention by scanning a continuous tone image with a scanning system wherein tone levels were recorded for each 1 decipoint increment along the X direction for the width of the photograph, and with these scan lines being spaced 1 decipoint apart along an axis in the Y direction. With this volume of raw data a computer was programmed so that for each halftone screen color the distances H, Y and X were in multiples of decipoints.

The computer selected from the scan line raw data the tone levels spaced apart in a horizontal direction by distance H. Similarly, the computer was programmed so that its leading command Y corresponded to multiples of the 1 decipoint increments of scan line spacing. Also, the computer was programmed to select from the raw data the offset distance X for the location of the first dot character in each dot character line for the halftone.

Although the invention has been described in conjunction with an electronic phototypesetter apparatus which employs a cathode ray tube for imaging dot characters onto a photosensitive recording medium, such as record 180, it is to be appreciated that the characters may be formed with other apparatus. For example, a laser beam generator may be employed in place of the cathode ray tube and, in such case, the halftone dot characters may be engraved directly into a printing plate by the formation therein of cavities having sizes and depths in accordance with the sizes of the dot characters described herein. The laser beam may be blanked and unblanked in the same sense as that of the cathode ray beam.

For example, a halftone dot character may be comprised of sub-dots, as with the cathode ray tube, with this character developed from a matrix of fiber optics. The illumination of each sub-dot being separately controlled to yield a sub-dot matrix providing a halftone dot character of the proper gray scale level. This entire character would be imaged momentarily at the position desired for it in the X and Y picture position. Thus with an optical output scanner similar in physical construction to the input scanner of FIG. 9 a screen pattern at an appropriate angle could be generated.

The invention herein has been described with reference to a particular preferred embodiment, although it is to be appreciated that the invention is not limited to same as various modifications and arrangement of parts will occur to those skilled in the art within the scope and spirit of the appended claims.

What is claimed is:

1. Apparatus for generating halftone images for reproducing an image in halftone copy and comprising means for controlling an energy beam for forming parallel rows of halftone dot characters parallel to a reference axis and spaced from each other so as to define a pattern of dot characters, said pattern of dot characters being spaced apart to define parallel screen lines oriented at a predetermined angle relative to said axis and means for adjusting the spacing between said dot characters for correspondingly varying the said predetermined screen line angle.

2. Apparatus as set forth in claim 1, including means for varying the size of each said dot character in dependence upon an associated tone level of a portion of a said image to be reproduced.

3. Apparatus as set forth in claim 1, wherein said image to be reproduced is a continuous tone color image having a plurality of color components each of which is to be reproduced in halftone copy with screen line angles respectively associated therewith and wherein said adjusting means includes means responsive to command signals for varying the said screen line angle of said pattern of dot characters to correspond with an associated one of said color components.

4. Apparatus as set forth in claim 3, wherein said spacing means includes first spacing means for varying the spacing between the dot characters in a direction parallel to said axis and second spacing means for varying the spacing between said rows.

5. Apparatus for generating halftone images for different color components of an image to be reproduced by deflecting an energy beam as it moves along a scan line across an energy responsive surface parallel to an axis comprising means for generating halftone dot characters at predetermined spaced apart positions along said scan line with the size of said characters being dependent upon the tone level of the image to be reproduced, and means for controlling the spacing between adjacent said positions such that the spacing between said dot characters of each pattern is associated with the color component of the halftone image being reproduced.

6. Apparatus as defined in claim 5, wherein said means for generating halftone characters comprises storage means for storing a plurality of sets of coded instructions, each set of coded instructions including instructions for deflecting said beam to form a respective dot character, and means for selecting sets of coded instructions and effecting deflection of said beam in accordance therewith in response to tone level signals to form dot characters at said positions along a scan line.

7. A method of forming halftone images for different color components of a continuous tone color image to be reproduced comprising providing tone signals indicating the tone level for each color component along scan lines extending parallel to each other through the image to be reproduced, generating halftone color component images by moving a beam along parallel halftone dot character lines and forming for each color component image an associated pattern of halftone dot characters with the dot characters with a given pattern being spaced apart by predetermined distances along the dot character lines and varying the size of the halftone dot characters within a said pattern as a function of the tone level of the halftone image being reproduced and varying the predetermined distances between said dot characters for respectively different dot patterns associated with different color components to correct for potential moire effects in a final image formed by superposing said different patterns respectively associated with said different color components.

8. Apparatus for generating halftone images for different color components of an image to be reproduced in halftone copy by deflecting an energy beam relative to an energy responsive surface and comprising means for generating a pattern of spaced apart halftone dot characters to be recorded on said energy responsive surface with the size of said characters being dependent upon the tone level of the image to be reproduced, and means for controlling the spacing between said halftone dot characters such that the spacing is in accordance with the particular color component of the image to be reproduced in halftone copy.

9. Apparatus as set forth in claim 8, wherein said generating means includes means for deflecting said beam to incrementally spaced dot character positions extending along dot character lines parallel to an axis with the spacing between dot character positions in a said row and the spacing between said rows being dependent upon a said color component.

10. Apparatus as set forth in claim 9, including storage means for storing a plurality of said coded instructions for deflecting said beam to form a respective dot character and means for interrogating said storage means to obtain therefrom selected sets of coded instructions for forming dot characters in dependence upon tone level signals.

11. Apparatus as set forth in claim 10, including means for effecting the deflection of said beam along a direction parallel to said axis to a first dot position for each row of dot characters wherein the said first position is dependent on a said color component.

12. Apparatus as set forth in claim 10, wherein said storage means includes means for storing coded instructions for the said incremental spacing of said dot characters in each said row of dot characters.

13. Apparatus as set forth in claim 12, including means for incrementally effecting relative positioning of said beam and said record member in a direction perpendicular to that of said axis after each row of dot characters has been formed.

14. Apparatus for reproducing continuous tone color images in halftone copy for each of a plurality of color components of a said image and comprising:

means for providing a plurality of tone level signals each having a characteristic that varies with the tone level of a said color image;

means for forming parallel rows of halftone dot characters on a record member in accordance with said tone level signals with said rows being spaced by a first distance and the said dot characters in each row being spaced by a second distance and said first and second distances being fixed for and dependent on the particular color component to be reproduced in halftone copy on said record member.

15. Apparatus as set forth in claim 14, wherein said forming means includes means for forming said halftone characters as light images to be recorded on a light sensitive record member.

16. Apparatus as set forth in claim 15, wherein said forming means includes a cathode ray tube and beam deflection means for deflecting the cathode ray beam to form light images on the display surface of said tube which are to be recorded on a said light sensitive record member.

17. A system for producing a halftone image that simulates a continuous tone image having a plurality of color components and tone levels and comprising:

means for providing a plurality of tone level signals for each color component of a said continuous tone image with each tone level signal having a characteristic representative of the tone level on a portion of said continuous tone image; and means for generating a plurality of halftone dot characters including circuit means responsive to said tone level signals for generating a plurality of halftone dot characters of sizes dependent on said tone level signals and located in parallel rows of dot characters with said rows being spaced apart by a first distance and the said dot characters in each row being spaced apart by a second distance wherein said first and second distances are fixed for an associated one of said color components and varied therefrom in dependence upon which of said color components is being reproduced in halftone copy; and means for recording said halftone dot characters on a record member for each of said color components.

18. A system as set forth in claim 17, wherein said generating means includes a cathode ray tube and beam deflection means for deflecting the cathode ray beam to form said dot characters on the face of said tube to be recorded on said record member.

19. Apparatus for reproducing a continuous tone color image in halftone copy for each of the subtractive primaries: black, magenta, cyan and yellow and comprising:

means for providing for each of said primary colors a pattern of tone level signals representative of relative tone levels of a said image to be reproduced;

character memory means for storing instructions for forming different dot characters of varying size representative of different tone levels;

means for interrogating said memory means in accordance with said tone level signals to obtain corresponding ones of said forming instructions; and means for forming said dot characters on a record member in dependence upon said corresponding forming instructions with said dot characters being sequentially formed along a line parallel to one of two mutually perpendicular coordinate axes and spaced apart along said line by a distance associated with a selected one of said colors.

20. Apparatus as set forth in claim 19, wherein said dot characters are formed along lines parallel to said first line with the first character in each line being offset from a common reference location by a distance dependent upon the selected one of said colors and means for effecting said offset in response to offset commands.

21. Apparatus as set forth in claim 19, wherein said forming means includes means for projecting an energy beam onto a said record member which is responsive thereto to define said dot characters, and deflecting means for deflecting said beam parallel to each of said coordinate axis in response to beam deflection signals.

22. Apparatus as set forth in claim 19, wherein additional said dot characters are formed along lines parallel to said first line with adjacent lines being spaced apart by a distance associated with the selected one of said colors and means for effecting said spacing in response to line spacing commands.

23. Apparatus as set forth in claim 22, wherein said spacing means includes means for displacing said record member perpendicularly relative to said parallel lines.

24. In a phototypesetting apparatus for forming a halftone exhibiting a pattern of dot characters defining screen lines extending parallel to each other with said screen lines being uniformly spaced apart by a predetermined distance and extending along a predetermined angle relative to one of two mutually perpendicular axes and comprising:

dot character memory means for storing dot character forming instructions for forming dot characters on an energy responsive record member of varying sizes corresponding to varying tone levels;

means for interrogating said memory means to obtain therefrom dot forming instructions corresponding to desired tone levels in response to dot character command signals;

an energy responsive record member;

means for projecting an energy beam onto said record member which is responsive to said beam, when unblanked, to form images thereon;

means for deflecting said beam parallel to each of said perpendicular axes in accordance with deflection signals;

dot character generating means for applying character generating deflection signals to said deflecting means for forming dot characters on said record member in dependence upon said dot forming instructions;

means for applying dot character positioning deflection signals to said deflection means for sequentially positioning said dot characters along a line parallel to one of said axes and spaced apart along said line in dependence upon said predetermined angle;

means for advancing said record member perpendicular to said one axis by a distance dependent upon said predetermined angle; and means for applying an offsetting dot character positioning deflection signal to said deflection means for offsetting the position of the first dot character in a second said line of dot characters from that of the first dot character in said first line of dot characters in dependence upon offset command signals.

25. A method of reproducing continuous tone color images in halftone copy for each of the subtractive primaries black, cyan, magenta and yellow and comprising the steps of:

scanning a said color image and providing a pattern of tone level signals for each color representative of the relative tone levels encountered during each scan;

storing a plurality of instructions for forming dot characters of varying sizes for respectively different tone levels; and forming dot characters on an energy responsive recording medium by deflecting an energy beam relative to first and second perpendicularly related axes and, for each said color, deflecting said beam to form a first said dot character of a size dependent upon said forming instructions for an associated said tone level at a first position and then positioning said beam in a direction parallel to one of said axes to a second position by a distance which is associated with the color for which a said halftone is being formed, forming a second said dot character at said second position and continuing said steps of beam energy positioning and character forming along said line until a first line of dot characters is formed, and then forming additional lines of dot characters along lines parallel to said first line of characters with the spacing between said lines of characters and the positions of the first character in said additional lines of characters being also associated with the color for which the halftone is being formed so that a pattern of halftone dot characters is formed on said record member exhibiting a screen angle associated with the said color and with the screen lines thereof having a predetermined spacing.

* * * * *